(12) United States Patent
Roiner

(10) Patent No.: US 8,197,666 B2
(45) Date of Patent: Jun. 12, 2012

(54) METHOD AND APPARATUS FOR THE MANUFACTURE OF ONE OR MORE GASES

(75) Inventor: Franz Roiner, Rattiszell (DE)

(73) Assignees: Maria Roiner, Rattiszell (DE), part interest; Henning Gensch, Hannover (DE), part interest; Barbara Gensch, Hannover (DE), part interest ( * ) Notice: Subject to any disclaimer, the term of this patent is extended or adjusted under 35 U.S.C. 154(b) by 1322 days.

(21) Appl. No.: 10/581,009

(22) PCT Filed: Nov. 26, 2004

(86) PCT No.: PCT/EP2004/013452
§ 371 (c)(1),
(2), (4) Date: May 30, 2006

(87) PCT Pub. No.: WO2005/052214
PCT Pub. Date: Jun. 9, 2005

(65) Prior Publication Data
US 2007/0108065 A1 May 17, 2007

(30) Foreign Application Priority Data

Nov. 28, 2003 (DE) ................................. 103 55 592
Dec. 18, 2003 (DE) ................................. 103 59 509

(51) Int. Cl.
*C02F 1/42* (2006.01)
*C02F 1/46* (2006.01)
*C02F 1/461* (2006.01)
*C25B 1/04* (2006.01)

(52) U.S. Cl. ...................... 205/792.5; 204/533; 204/528; 204/272; 204/278; 205/628; 205/637

(58) Field of Classification Search .................. 204/528, 204/533; 205/792.5
See application file for complete search history.

(56) References Cited

U.S. PATENT DOCUMENTS

| 5,348,683 | A | 9/1994 | Kaczur et al. |
| 5,401,371 | A | 3/1995 | Oshima et al. |
| 2004/0045836 | A1* | 3/2004 | Tseng ........................... 205/620 |
| 2005/0070840 | A1* | 3/2005 | Matsumura et al. ............ 604/20 |

FOREIGN PATENT DOCUMENTS

| EP | 0 237 402 | * | 2/1987 |
| EP | 0650929 | | 5/1995 |
| JP | 59-092028 | | 5/1984 |
| JP | 7-268675 | | 10/1995 |
| JP | 2000-265290 | | 9/2000 |
| JP | 2002-155387 | | 5/2002 |
| JP | 2002-066563 | | 3/2005 |
| WO | 90/15659 | | 12/1990 |

* cited by examiner

*Primary Examiner* — Harry D Wilkins, III
*Assistant Examiner* — Zulmariam Mendez
(74) *Attorney, Agent, or Firm* — Dilworth & Barrese, LLP

(57) ABSTRACT

A method serves the production of one or more gases, in particular of oxyhydrogen. A liquid, preferably water (9), is electrolytically treated in the method. To improve the efficiency of a method of this type, a substance is present in the liquid (9) to which the or one of the gases to be produced adheres, in particular an ion exchanger (10) (single FIGURE).

28 Claims, 1 Drawing Sheet

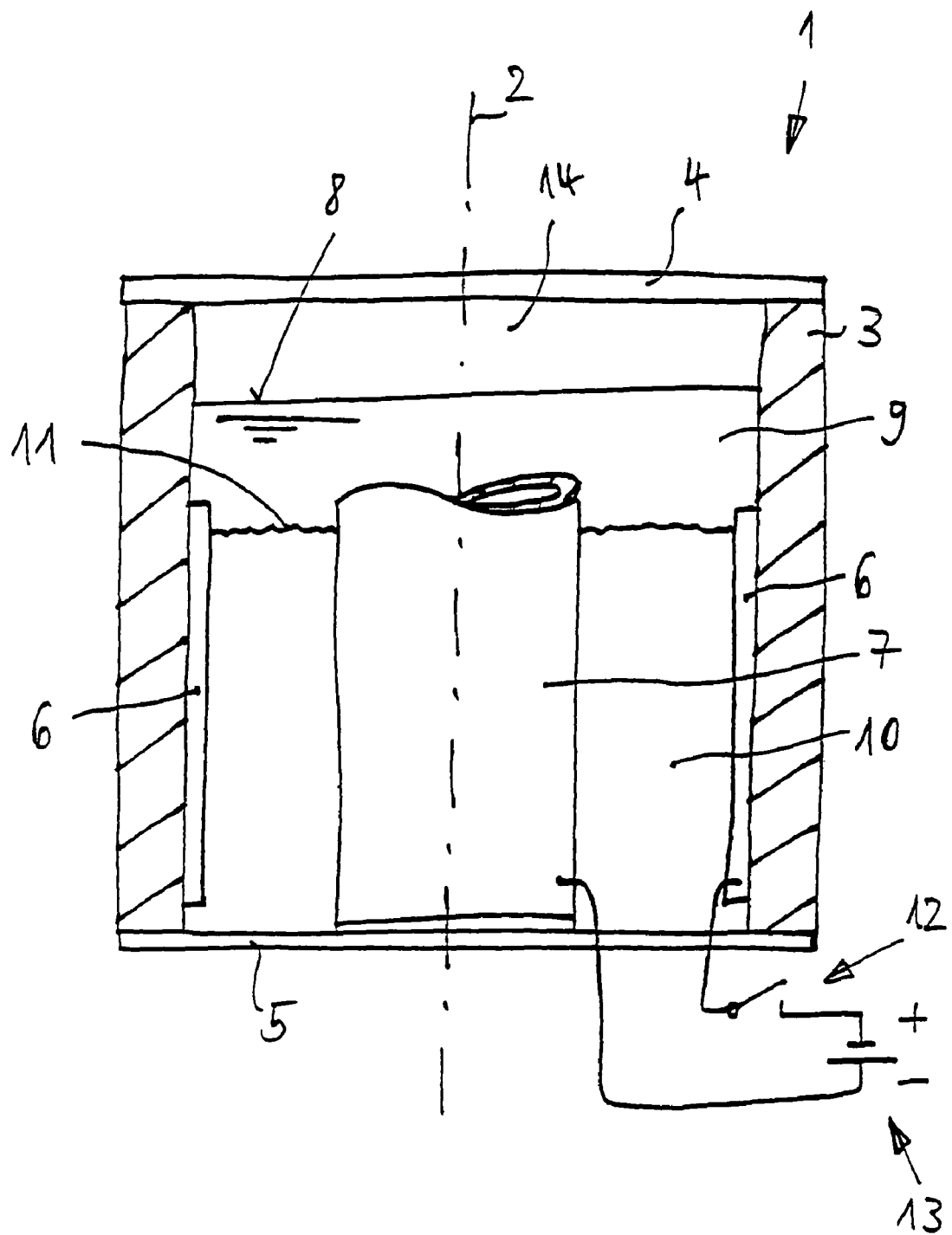

METHOD AND APPARATUS FOR THE MANUFACTURE OF ONE OR MORE GASES

BACKGROUND OF THE INVENTION

The invention relates to a method for the manufacture of one or more gases and to an apparatus for the carrying out of a method of this type.

In the method, a liquid containing the gas to be produced is treated electrolytically. One or more gases are formed by the electrolysis. The method in particular serves to produce hydrogen or hydrogen and oxygen, the latter in particular as a mixture (oxyhydrogen).

Methods for the manufacture of hydrogen or of hydrogen and oxygen or of oxyhydrogen are already known. Water is used for this in the typical electrolytic methods. The water molecules contain hydrogen and oxygen. However, the efficiency and the reaction rate of the previously known methods are suitable for improvement.

An apparatus for the electrolytic production of hydrogen and oxygen is known from U.S. Pat. No. 5,879,522 which comprises an anode chamber and a cathode chamber in which electrically conductive ultramicroelectrode particles are present which are in each case in contact with the cathode and the electrode and which serve the improvement of the conductivity and the minimization of overpotentials.

A method for the electrolysis of water is known from JP 2002-322584 A in which the reaction is supported by a fine jewel powder or rock powder or by a fine powder of different types of minerals or metals. The fine powders are intended to improve the conductivity.

DE 100 16 591 C2 discloses a method of generating hydrogen in which a first electrolyte is provided in the interior space of a hollow microfiber and a second electrolyte is provided outside the hollow microfiber. The hollow microfiber bears anode and cathode separately on its wall surfaces.

US 2001/0050234 A1 discloses an electrolytic cell comprising a first electrode and a second electrode between which an electrolytic membrane is arranged. An electron-exchange resin can be used for the electrolytic membrane.

SUMMARY OF THE INVENTION

It is the object of the invention to provide an improved method of the initially recited type.

This object is solved in accordance with the invention by the features herein. A substance is present in the liquid to which the or one of the gases adheres which is to be produced by the electrolysis. This gas preferably adheres to the substance in an ionic bond.

Advantageous further developments of the invention are described in the dependent claims.

It is advantageous if hydrogen, preferably in an ionic bond, adheres to the substance present in the liquid.

The gas to be produced is preferably hydrogen.

The gases to be produced can be hydrogen and oxygen. It is possible in this process to produce hydrogen and oxygen separately. It is, however, also possible to produce hydrogen and oxygen in a mixture (oxyhydrogen). The native production of oxyhydrogen is particularly advantageous. In accordance with the method in accordance with the invention, the oxyhydrogen can produced in the correct (stoichiometric) mixture ratio. It can in particular be used in this form for the production of energy.

The liquid containing the or a gas to be produced is preferably water.

A further advantageous further development is characterized in that the substance to which the or a gas to be produced adheres is an ion exchanger. This substance can in particular be an ion-exchange resin.

The ion exchanger is preferably an acid ion exchanger, in particular a very acid ion exchanger.

The substance to which the or a gas to be produced adheres or the ion exchanger can be gel-like.

It is advantageous for the ion exchanger to comprise or consist of a matrix, active groups and ions to be exchanged. The matrix can in particular be a crosslinked plastic, in particular crosslinked polystyrene. The active groups are preferably sulfonic acid groups ($SO_3$). The ions to be exchanged are preferably hydrogen ions (H). The ion exchanger can in particular have the general chemical formula $R-SO_3-H$.

A further advantageous further development is characterized in that the substance to which the or a gas to be produced adheres or the ion exchanger, in particular the base ion exchanger material, contains catalytically acting substances. The catalytically acting substances can in particular be conductive substances, in particular conductive films. The catalytically active substances can be mixed to the substance or to the ion exchanger or to the base ion exchanger material.

In accordance with a further advantageous further development, the substance to which the or a gas to be produced adheres or the ion exchanger or the base ion exchanger material contains catalytically acting and/or gas delivering enzymes. Organic acids, in particular tartaric acid, are used as such enzymes. The enzymes can be added to the substance or to the ion exchanger or to the ion-exchange resin or to the base ion exchanger material.

An apparatus in accordance with the invention for the carrying out of the method in accordance with the invention is characterized by the features of claim 15. It includes a container comprising a liquid as well as a positive electrode and a negative electrode which can be or are connected to a current source. A substance is present in the liquid to which the or a gas to be produced in the electrolysis adheres.

An electrode is preferably tubular in design.

A filler material can be present in the liquid containing the gas to be produced and a substance to which the gas to be produced adheres, in particular inside the tubular electrode. This material is preferably wad material.

An acid is preferably present in the filler material. This material is preferably wetted with an acid. The acid is preferably hydrochloric acid.

In contrast to U.S. 2001/0050234 A1, no proton conductive membrane is required in accordance with the invention. It is possible with the invention not to integrate the substance to which the or a gas to be produced adheres, in particular an ion exchanger, into a membrane. It is possible to arrange this substance or ion exchanger such that it can be in communication both with the anode and with the cathode and with the liquid. It is furthermore possible to use an electrically non-conductive substance to which the or a gas to be produced adheres, in particular an electrically non-conductive ion exchanger. It is made possible by the invention to use a substance to which the or a gas to be produced adheres, in particular an ion exchanger, in which the marginal groups adhering thereto by ionic bonding and/or by van der Waals forces are released in the electrolysis.

BRIEF DESCRIPTION OF THE DRAWING

An embodiment of the invention will be explained in detail in the following with reference to the enclosed drawing. In the drawing, the only FIGURE shows an apparatus for the production of oxyhydrogen in a schematic view.

DESCRIPTION OF THE PREFERRED EMBODIMENT

The apparatus shown in the only FIGURE comprises a container 1 which is designed rotationally symmetrically around the center axis 2 and consists of a tubular housing 3 which is closed by an upper cover 4 and a lower cover 5. The total apparatus is preferably made longer than shown.

An annular outer electrode 6 is provided at the inner wall of the housing 3. A tubular inner electrode 7 is located in the interior of the housing 3. The container 1 is filled with water 9 up to the water level 8.

An ion exchanger 10, which is present in gel-like form up to the level 11, is present between the electrodes 6 and 7.

The outer electrode 6 is connected to the plus pole of a power source 13, for example a 12V car battery, via a switch 12. The minus pole of the power source 13 is connected to the inner electrode 7. The polarity can, however, also be reversed.

In the embodiment shown, the water level 8 is above the level 11 of the gel-like ion exchanger 10 and above the upwardly open tube of the inner electrode 7. The electrode 7 can, however, also be made closed. Another possibility consists of the electrode 7 projecting beyond the water level 8. Furthermore, in the embodiment shown, the level 11 of the gel-like ion exchanger 10 is just beneath the upper end of the outer electrode 6. The apparatus can, however, also be designed such that this level 11 lies above the upper end of the electrode 6. The inner electrode 7 can be downwardly closed or open. It can furthermore be open at its lower end or sealingly connected to the lower cover 5.

When the switch 12 is closed, an electrolytic reaction takes place in the container 1 in which negatively charged electrons and ions are attracted by the positive outer electrode 6. Positive ions migrate to the negative inner electrode 7. In this manner, oxyhydrogen is produced in the space 14 between the water level 8 and the upper cover 4, with this being a question of a native production of oxyhydrogen. This reaction is substantially accelerated by the ion exchanger 10. The oxyhydrogen is present in a stoichiometric ratio. It can be drawn out (not shown in the drawing) of the space 14. This can take place discontinuously (batch operation) or continuously. It is furthermore possible to collect and drain off the hydrogen produced and the oxygen produced separately by a corresponding design of the container 1.

The ion exchanger 10 is a highly acid, gel-like ion exchanger with sulfonic acid groups as the active groups. The ion exchanger has the general chemical formula R—$SO_3$—H, where R is a matrix, in particular a crosslinked polystyrene matrix, $SO_3$ is a sulfonic active group and H is hydrogen.

The ion exchanger 10 is preferably kept in motion. This preferably takes place such that the ion exchanger 10 does not subside. The ion exchanger can be kept in motion by a fluidized bed process. If the ion exchanger is kept in motion the gas production and the electron flow are improved.

In accordance with a further advantageous further development, the ion exchanger is kept in suspension in the liquid. This preferably takes place in that the ion exchanger or the base ion exchanger material are produced such that they remain in suspension per se in the liquid, that is in the water 9.

The method can be carried out continuously. For this purpose, the ion exchanger 10 can be supplied and drained off continuously (not shown in the drawing). The drained off ion exchanger can be regenerated and supplied again.

The method can also be carried out in multiple stages.

The gas which is formed can be sucked out of the space 14. It is possible for this purpose to generate a vacuum in this space 14. It can hereby furthermore be achieved that the gas escaping upwardly takes along the ion exchanger 10 and in this manner effects a mixing and spreading of the ion exchanger 10.

The pressure and the temperature can be set such that the process operates at an ideal efficiency.

The measured values shown in the following were determined in practical experiments:

EXAMPLE 1

| Experiment No. | Amperage (A) | Voltage (V) | Power (W) | Gas volume produced (ml/min) | Energy per time (W) | Efficiency |
|---|---|---|---|---|---|---|
| 1 | 1.0 | 10.2 | 10.2 | 10 | 1.8 | 0.176 |
| 2 | 3.0 | 9.2 | 27.6 | 40 | 7.2 | 0.260 |
| 3 | 7.5 | 6.5 | 48.75 | 100 | 18.0 | 0.370 |
| 4 | 8.1 | 5.7 | 46.17 | 115 | 20.7 | 0.448 |

Experiment No. 1 is a comparative experiment which was carried out in water without ion exchanger. A low amount of ion exchanger was used in Experiment No. 2. Experiment No. 3 was carried out with a large amount of ion exchanger. In Experiment No. 4, a low amount of hydrochloric acid was additionally added.

In Experiment No. 1 a current of 1.0 A is supplied at a voltage of 10.2 V so that the supplied electrical power amounts to 10.2 W. In this process, 10 ml/min oxyhydrogen is produced, which corresponds to an energy content per time to the amount of 1.8 W. This results in an efficiency of (1.8: 10.2=) 0.176.

By the addition of the ion exchanger, the amperage per added amounts increases via 3.0 to 7.5 A, while the voltage correspondingly drops via 9.2 V to 6.5 V. The amount of oxyhydrogen produced increases via 40 ml/min to 100 ml/min. The efficiency increases via 0.260 to 0.370.

Due to the addition of a low amount of hydrochloric acid in Experiment No. 4, the amperage increases further to 8.1 A and the voltage drops further to 5.7 V. The amount of oxyhydrogen produced increases further to 115 ml/min, whereby the efficiency increases to 0.448.

EXAMPLE 2

The experimental arrangement shown in the only FIGURE was used, but with the polarity being reversed. The housing 3 forming the minus electrode is designed as a tube with a length of 116 mm, an internal diameter of 26 mm and an external diameter of 28 mm. The inner electrode 7 forming the plus electrode is designed as a tube with a length of 116 mm, an internal diameter of 14 mm and an external diameter of 16 mm. A battery charger 13 is used as the power source which emits a DC current with a voltage of 12 V. Styrene-DVB of the company Amberlit was used as the ion exchanger which is available in the form of dark amber balls. The functional group of this ion exchanger is formed by sulfonic acid. The interior of the inner electrode 7 was filled with wadding (without any further additive).

To carry out the experiments, the electrode arrangement is filled with 50 ml drinking water, which corresponds to an amount of substance of 2.75 mol. The total arrangement is put completely "under water" so that a liquid exchange can take place between the interior of the inner electrode 7 and the annular space between the inner electrode 7 and the housing 3, and indeed both over the upper end of the inner electrode 7 and over its lower end, that is the intermediate space between the lower end of the inner electrode 7 and the lower cover 5. The drinking water has a pH of 7.0, an electrical conductivity of 266 µS/cm (at 25° C.) and a water hardness of 5.4 dH°. When the DC voltage is applied, the values shown below result in dependence on the added amount of ion exchanger for the amperage, the voltage, the power and the mass of oxyhydrogen (KG) which is formed per time and which is given as the standard volume, with the already described ion exchanger being used:

| Experiment No. | Amperage (A) | Voltage (V) | Power (W) | Gas volume produced (ml/min) | Ion exchanger (ml) |
|---|---|---|---|---|---|
| 1 | 0.70 | 11.00 | 7.70 | 5.0 | 0 |
| 2 | 0.80 | 9.90 | 7.92 | 10.0 | 1 |
| 3 | 1.55 | 9.50 | 14.72 | 20.0 | 2 |
| 4 | 1.67 | 9.35 | 15.61 | 22.0 | 3 |
| 5 | 1.92 | 9.20 | 17.66 | 24.0 | 4 |
| 6 | 2.09 | 9.10 | 19.02 | 26.0 | 5 |
| 7 | 2.27 | 9.00 | 20.43 | 28.0 | 6 |
| 8 | 2.75 | 8.80 | 24.20 | 30.0 | 7 |
| 9 | 3.50 | 8.30 | 29.05 | 40.0 | 10 |
| 10 | 3.85 | 8.00 | 30.80 | 50.0 | 15 |
| 11 | 4.40 | 7.80 | 34.32 | 60.0 | 20 |
| 12 | 4.60 | 7.60 | 34.96 | 70.0 | 25 |

No ion exchanger was added in the first Experiment. 5.0 ml/min oxyhydrogen was produced. This amount is doubled by the addition of 1 ml ion exchanger. The amount of oxyhydrogen produced per minute increases as the amount of ion exchanger increases.

EXAMPLE 3

The same experimental arrangement as in Example 2 was used, but with the length of the housing 3 and of the inner electrode 7 being increased from 116 mm to 270 mm. The experimental arrangement has otherwise not been changed. The following measured values resulted:

| Experiment No. | Amperage (A) | Voltage (V) | Power (W) | Gas volume produced (ml/min) | Ion exchanger (ml) |
|---|---|---|---|---|---|
| 1 | 1.5 | 10.50 | 15.75 | 12 | 0 |
| 2 | 2.0 | 10.00 | 20.00 | 30 | 1 |
| 3 | 3.0 | 9.20 | 27.60 | 40 | 2 |
| 4 | 6.05 | 7.00 | 42.35 | 55 | 3 |
| 5 | 6.55 | 6.60 | 43.23 | 70 | 4 |
| 6 | 6.85 | 6.40 | 43.84 | 80 | 5 |
| 7 | 6.90 | 6.30 | 43.47 | 85 | 6 |
| 8 | 7.15 | 6.20 | 44.33 | 95 | 7 |
| 9 | 7.45 | 6.00 | 44.70 | 100 | 10 |
| 10 | 7.70 | 5.85 | 45.04 | 110 | 20 |
| 11 | 8.00 | 5.75 | 46.00 | 115 | 30 |
| 12 | 8.10 | 5.40 | 43.74 | 120 | 40 |

The method in accordance with the invention can be carried out in the manner such that a substance to which the gas to be produced adheres, in particular in an ionic bond, e.g. an acid cation exchanger, is added as a catalyst and donor to a liquid, in particular water, in the electrolysis so that the decomposition of the substance to be decomposed, e.g. water, is accelerated by a multiple factor, with the added substance not being an acid and not being a base and not being an ion exchange membrane. In a particular aspect, an ion exchanger, in particular a cation exchange resin and/or an anion exchange resin, is added to the electrolysis procedure known per se e.g. on the electrolysis of water for the production of hydrogen and oxygen or oxyhydrogen and serves as a catalyst to increase the current flow and can simultaneously contribute to the carrying out of the process as a donor of hydrogen and/or oxygen. In this manner, efficiencies of 0.6 to 0.85 can be achieved in dependence on the embodiment at an intensity of current of, for example, 3,900 C/min. A corresponding apparatus can produce oxyhydrogen in a quantity of 14.6 l/h. The apparatus for the production of oxyhydrogen can be a component of an engine and natively produce oxyhydrogen required for the engine. In this manner, a liquefying and storing of the oxyhydrogen can be made superfluous since it can be produced continuously in the required amount. It is, however, also possible to produce and utilize hydrogen and oxygen separately.

A filler material, in particular wadding, can be present in the interior of the tubular electrode 7. This material or the wadding can be wetted with an acid, preferably hydrochloric acid. The yield can hereby be substantially increased, as recited in Example 1, Experiment No. 4.

The electrolytically treated liquid can be water. Other liquids are, however, also possible which contain the gas to be produced, e.g. hydrogen or another substance.

The invention claimed is:

1. A method of producing hydrogen and/or oxyhydrogen gases, comprising the steps of
arranging a liquid (9) such as water between a cathode (6) and an anode (7), also arranging an electrically non-conductive ion exchanger (10) within the liquid (9) and directly between the cathode (6) and anode (7) without any intervening membrane,
electrolytically treating the liquid (9),
the hydrogen and/or oxyhydrogen adhering to the ion exchanger (10) present in the liquid (9), by marginal groups adhering thereto by ionic bonding and/or van der Waals forces being released in the electrolysis and escaping upwardly into a space (14) above the liquid (9), and
capturing and retaining the thus-generated hydrogen and/or oxyhydrogen gas from the space (14) above the liquid.

2. A method in accordance with claim 1, wherein the gas to be produced is hydrogen.

3. A method in accordance with claim 1, wherein the gases to be produced are hydrogen and oxygen.

4. A method in accordance with claim 1, wherein the liquid (9) is water.

5. A method in accordance with claim 1, wherein the substance (10) to which the gas adheres is an ion exchanger.

6. A method in accordance with claim 5, wherein the ion exchanger (10) is an acid ion exchanger.

7. A method of producing hydrogen and/or oxyhydrogen gases, comprising the steps of
arranging a liquid (9) such as water between a cathode (6) and an anode (7),
also arranging an electrically non-conductive ion exchanger (10) within the liquid (9) and directly between the cathode (6) and anode (7) without any intervening membrane,
electrolytically treating the liquid (9), the hydrogen and/or oxyhydrogen adhering to the ion exchanger (10) present in the liquid (9), by marginal groups adhering thereto by ionic bonding and/or van der Waals forces being released in the electrolysis and escaping upwardly into a space (14) above the liquid (9), and capturing and retaining the thus-generated hydrogen and/or oxyhydrogen gas from the space (14) above the liquid (9), wherein the ion exchanger (10) is of gel-like form.

8. A method in accordance with claim 5, wherein the ion exchanger (10) comprises a matrix, active groups and ions to be exchanged.

9. A method in accordance with claim 5, wherein the ion exchanger (10) contains catalytically acting substances.

10. A method in accordance with claim 5, wherein the ion exchanger (10) contains catalytically acting and/or gas delivering enzymes.

11. A method in accordance with claim 5, wherein the ion exchanger (10) is kept in motion.

12. A method in accordance with claim 5, wherein the ion exchanger (10) is kept in suspension in the liquid (9).

13. A method in accordance with claim 5, wherein the ion exchanger (10) is supplied continuously.

14. A method in accordance with claim 1, carried out in multiple stages.

15. An apparatus for carrying out the method in accordance with claim 1, comprising a container (1), a liquid (9) such as water situated within the container (1), an electrically non-conductive ion exchanger (10) present in the liquid (9) and to which one or more of the gases to be produced adheres, a positive electrode (6) and negative electrode (7) situated within the container (10), structured and arranged to be connected to a power source (13) and with the electrically non-conductive ion exchanger (10) situated directly between the cathode (6) and anode (7) without any intervening membrane, and means (14) for accumulating, capturing and retaining the hydrogen and/or oxyhydrogen gases within the container (1) and above an upper level (8) of the liquid (9) therein, with marginal groups adhering to the electrically non-conductive ion exchanger by ionic bonding and/or van der Waals forces being released in the electrolysis.

16. An apparatus in accordance with claim 15, wherein an electrode (7) is tubular in design.

17. An apparatus in accordance with claim 15, wherein a filler material is present, in particular inside the tubular electrode (7), in the liquid (9) containing the gas to be produced and a substance (10) to which the gas to be produced adheres.

18. An apparatus in accordance with claim 17, wherein an acid is present in the filler material.

19. An apparatus in accordance with claim 16, wherein a filler material is present, in particular inside the tubular electrode (7), in the liquid (9) containing the gas to be produced and a substance (10) to which the gas to be produced adheres.

20. An apparatus in accordance with claim 19, wherein an acid is present in the filler material.

21. An apparatus in accordance with claim 15, wherein said container (1) is formed by a housing (3) and top cover (4) and said means (14) include an enclosed space (14) situated above the upper level (8) of the liquid (9) within the container (1), underneath the top cover (4) and laterally adjacent walls of the housing (3).

22. An apparatus in accordance with claim 15, wherein the ion exchanger (10) comprises a matrix of cross-linked plastic.

23. A method in accordance with claim 8, wherein the ion exchanger (10) comprises a matrix of cross-linked plastic.

24. An apparatus in accordance with claim 15, additionally comprising means for keeping the ion exchanger (10) in motion by a fluidized bed process to improve gas production and electron flow.

25. A method in accordance with claim 1 wherein H-ions are separated at the ion exchanger (10).

26. An apparatus in accordance with claim 21, additionally comprising means for suctioning out the hydrogen and/or oxyhydrogen gases from said space (14) above the upper level (8) of the liquid (9) within the container (1).

27. An apparatus in accordance with claim 16, wherein said container (1) is formed by tubular housing (3) closed by upper and lower covers (4, 5).

28. A method in accordance with claim 1, wherein the liquid is water.

* * * * *